United States Patent
Lee

(10) Patent No.: US 10,370,535 B2
(45) Date of Patent: Aug. 6, 2019

(54) FLAME RETARDANT RESIN COMPOSITION AND MOLDED ARTICLE USING THE SAME

(71) Applicant: Lotte Advanced Materials Co., Ltd., Yeosu-si (KR)

(72) Inventor: Jo Won Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 111 days.

(21) Appl. No.: 15/609,105

(22) Filed: May 31, 2017

(65) Prior Publication Data

US 2017/0349746 A1 Dec. 7, 2017

(30) Foreign Application Priority Data

Jun. 3, 2016 (KR) .................. 10-2016-0069869

(51) Int. Cl.
| | |
|---|---|
| *C08L 69/00* | (2006.01) |
| *C09K 21/02* | (2006.01) |
| *C08K 3/26* | (2006.01) |
| *C08L 51/08* | (2006.01) |

(52) U.S. Cl.
CPC ............ *C08L 69/00* (2013.01); *C08K 3/26* (2013.01); *C08L 51/085* (2013.01); *C09K 21/02* (2013.01); *C08K 2003/265* (2013.01); *C08K 2003/267* (2013.01); *C08L 2201/02* (2013.01); *C08L 2207/53* (2013.01)

(58) Field of Classification Search
CPC .. C08L 69/00; C08L 2201/02; C08L 2207/53; C09K 21/02
USPC ......................................................... 524/424
See application file for complete search history.

(56) References Cited

U.S. PATENT DOCUMENTS

| | | | |
|---|---|---|---|
| 6,043,312 A | 3/2000 | Fagher et al. | |
| 6,362,269 B1* | 3/2002 | Ishihata ................ | C08K 7/00 524/449 |
| 6,547,992 B1* | 4/2003 | Schlosser ........... | C08K 5/34928 252/609 |
| 8,673,997 B2 | 3/2014 | Park et al. | |
| 9,127,154 B2 | 9/2015 | Li et al. | |
| 2008/0090961 A1* | 4/2008 | Li ........................ | C08L 69/00 525/63 |
| 2012/0302663 A1 | 11/2012 | Park et al. | |

FOREIGN PATENT DOCUMENTS

| | | |
|---|---|---|
| CN | 101522803 A1 | 9/2009 |
| JP | 05-170984 A | 7/1993 |
| JP | 05170984 A * | 7/1993 |
| JP | 2015-189903 A | 11/2015 |
| KR | 10-2009-0064574 A | 6/2009 |
| KR | 10-2012-0078559 A | 7/2012 |

OTHER PUBLICATIONS

Extended Search Report in counterpart European Application No. 17174074.9 dated Oct. 30, 2017, pp. 1-5.
Office Action in counterpart Chinese Application No. 201710406094.6 dated Feb. 26, 2019, pp. 1-8.
English-translation of Office Action in counterpart Chinese Application No. 201710406094.6 dated Feb. 26, 2019, pp. 1-6.

\* cited by examiner

*Primary Examiner* — Hui H Chin
(74) *Attorney, Agent, or Firm* — Additon, Higgins & Pendleton, P.A.

(57) ABSTRACT

A flame retardant resin composition that can have excellent low smoke properties includes (A) a polycarbonate resin, (B) a silicon impact modifier, and (C) a flame retardant, wherein the (B) silicon impact modifier comprises particles having a core-shell structure, and including about 60 wt % or more of a siloxane polymer, and wherein the (C) flame retardant includes a mixture of magnesium carbonate represented by Formula 1 and magnesium calcium carbonate represented by Formula 2:

$$Mg_a(CO_3)_b(OH)_{2a-2b} \cdot cH_2O \qquad \text{[Formula 1]}$$

wherein a, b and c are as defined in the detailed description;

$$Mg_xCa_y(CO_3)_{x+y} \cdot mH_2O \qquad \text{[Formula 2]}$$

wherein x, y and m are as defined in the detailed description.

19 Claims, No Drawings

FLAME RETARDANT RESIN COMPOSITION AND MOLDED ARTICLE USING THE SAME

CROSS-REFERENCE TO RELATED APPLICATION

This application claims priority under 35 USC Section 119 to and the benefit of Korean Patent Application No. 10-2016-0069869, filed on Jun. 3, 2016, in the Korean Intellectual Property Office, the entire disclosure of which is incorporated herein by reference.

FIELD

The present invention relates to a flame retardant resin composition and a molded article produced therefrom.

BACKGROUND

Typically, metallic materials including steel have been used as interior and exterior materials of transportation equipment such as railway vehicles. However, with increasing demand for improved fuel efficiency in recent years, substitution of the metallic materials with plastic materials has been actively studied. There are strict requirements that materials used in transportation equipment have low smoke properties, which allow low smoke generation in the event of fire, to secure passenger safety, and the like.

Polycarbonate resins can have excellent mechanical properties, such as moldability, impact resistance and tensile strength, as well as excellent electrical properties, transparency and the like, and thus are widely used for automobiles, electronics, and the like. Typically, a polycarbonate resin composition is obtained by blending a polycarbonate with an acrylonitrile-butadiene-styrene (ABS) resin, followed by adding a phosphorus flame retardant to the blend. Despite various merits of excellent moldability, heat resistance, moisture resistance, impact strength and flame retardancy, such a typical polycarbonate resin composition is not suitable as a material for transportation equipment due to generation of an excess of smoke upon burning thereof.

For this reason, typically, resins such as polyimides or polyamides have been mainly used for transportation applications. However, polyimide or polyamide resins are expensive and have poor moldability and poorer mechanical properties than polycarbonates.

Therefore, there is a need for a polycarbonate resin composition having excellent moldability and mechanical properties while securing low smoke properties.

SUMMARY OF THE INVENTION

Exemplary embodiments relate to a flame retardant resin composition that can have excellent moldability and mechanical properties as well as low smoke properties.

Exemplary embodiments also relate to a flame retardant resin composition that can have a high critical heat flux at extinguishment and low heat emission rate.

Exemplary embodiments also relate to a molded article produced from the flame retardant resin composition as set forth above.

In exemplary embodiments, the flame retardant resin composition includes: (A) a polycarbonate resin; (B) a silicon impact modifier; and (C) a flame retardant, wherein the (B) silicon impact modifier includes particles having a core-shell structure, and includes about 60% by weight (wt %) or more of a siloxane polymer and the (C) flame retardant includes a mixture of magnesium carbonate represented by the following Formula 1 and magnesium calcium carbonate represented by the following Formula 2:

$$Mg_a(CO_3)_b(OH)_{2a-2b} \cdot cH_2O \quad \text{[Formula 1]}$$

wherein a is 1 to 6, b is 0 to 5, and c is 0 to 6.

$$Mg_xCa_y(CO_3)_{x+y} \cdot mH_2O \quad \text{[Formula 2]}$$

wherein x and y are the same or different and are each independently 1 to 5, and m is 0 to 5.

The flame retardant resin composition can include the silicon impact modifier in an amount of about 1 part by weight to about 10 parts by weight relative to about 100 parts by weight of the (A) polycarbonate resin, and may include a core composed of a siloxane polymer and a shell composed of a (meth)acrylic polymer.

The (B) silicon impact modifier may include the siloxane polymer and the (meth)acrylic polymer in a weight ratio of about 3:1 to about 10:1.

The flame retardant resin composition can include the mixture of magnesium carbonate represented by Formula 1 and magnesium calcium carbonate represented by Formula 2 in an amount of about 1 part by weight to about 20 parts by weight relative to about 100 parts by weight of the (A) polycarbonate resin.

In exemplary embodiments, the magnesium carbonate represented by Formula 1 may be hydromagnesite, and the magnesium calcium carbonate represented by Formula 2 may be huntite.

In exemplary embodiments, the flame retardant may include a mixture of hydromagnesite and huntite.

Exemplary embodiments also relate to a molded article produced from the flame retardant resin composition as set forth above.

The molded article may have a cumulative value of specific optical densities in the first 4 min of the test (VOF4) of about 300 minutes or less, for example, about 280 minutes or less, for example, about 150 minutes to about 270 minutes, as measured in accordance with ISO 5659-2.

The molded article may have a critical heat flux at extinguishment (CFE) of about 10 kW/m² or more, for example, about 15 kW/m² or more, for example, about 20 kW/m² to about 25 kW/m², as measured in accordance with ISO 5658-2.

The molded article may have a maximum average rate of heat emission (MARHE) of about 105 kW/m² or less, for example, about 100 kW/m² or less, for example, about 80 kW/m² to about 90 kW/m², as measured in accordance with ISO 5660-1.

The molded article according to the present invention may be an interior and/or exterior material of transportation equipment.

The flame retardant resin composition can provide excellent low smoke properties while minimizing deterioration in moldability and mechanical properties of a polycarbonate resin.

In addition, the flame retardant resin composition can have excellent flame retardancy due to high CFE and low heat emission rate (MARHE) thereof.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

As used herein, the term "(meth)acrylic polymer" collectively refers to acrylic polymers and/or methacrylic polymers.

According to exemplary embodiments, a flame retardant resin composition includes (A) a polycarbonate resin, (B) a silicon impact modifier, and (C) a flame retardant.

Hereinafter, each of the components of the resin composition according to the present invention will be described in detail.

(A) Polycarbonate Resin

The (A) polycarbonate resin according to the present invention is a polyester having a carbonate bond and may be any polycarbonate resin generally known in the art without limitation.

The polycarbonate resin may be prepared by reacting one or more diphenols with phosgene, a halogen acid ester, a carbonic acid ester, or a combination thereof.

The diphenols may include combinations of two or more diphenols and constitute a repeat unit of the polycarbonate resin.

Examples of the diphenols may include without limitation hydroquinone, resorcinol, 4,4'-dihydroxydiphenyl, 2,2-bis(4-hydroxyphenyl)propane (also referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations and/or mixtures thereof. In exemplary embodiments, the diphenol can include 2,2-bis(4-hydroxyphenyl)propane, 2,2-bis(3,5-dichloro-4-hydroxyphenyl)propane and/or 1,1-bis(4-hydroxyphenyl)cyclohexane. For example, the diphenol can include 2,2-bis(4-hydroxyphenyl)propane.

The polycarbonate resin may be a copolymer prepared from two or more diphenols.

In addition, the polycarbonate resin may include a linear polycarbonate resin, a branched polycarbonate resin, a polyester carbonate copolymer, and the like, and combinations and/or mixtures thereof.

Examples of the linear polycarbonate resin may include bisphenol-A polycarbonate resins. Examples of the branched polycarbonate resin may include polymers prepared by reacting a polyfunctional aromatic compound such as trimellitic anhydride and/or trimellitic acid with diphenols and a carbonate. The polyester carbonate copolymer may be prepared by reacting a bifunctional carboxylic acid with diphenols and a carbonate. In exemplary embodiments, the carbonate may be a diaryl carbonate, such as diphenyl carbonate, and/or ethylene carbonate.

(B) Silicon Impact Modifier

The flame retardant resin composition according to the present invention includes the (B) silicon impact modifier. The silicon impact modifier may be composed of particles having a core-shell structure and having high silicon content.

In exemplary embodiments, the silicon impact modifier can include a core-shell structured impact modifier. The silicon impact modifier can include about 60 wt % or more of a siloxane polymer. For example, the silicon impact modifier can include the siloxane polymer in an amount of about 70 wt % to about 99 wt %, and as another example, about 80 wt % to about 95 wt %, based on the total weight (100 wt %) of the impact modifier.

Typically, although an acrylic rubber and/or diene rubber impact modifier has been mainly used as an impact modifier, such an impact modifier cannot provide low smoke properties required of materials for transportation equipment. In addition, a silicon impact modifier having low silicon content cannot secure sufficient flame retardancy due to high heat quantity. However, the inventors of the present invention found that an impact modifier having high silicon content according to the present invention can secure excellent low smoke properties and flame retardancy.

The (B) silicon impact modifier according to the present invention may include a core comprising a siloxane polymer, and a shell comprising a (meth)acrylic polymer.

In some embodiments, the core may include (and/or consist of) a siloxane polymer, i.e., the core can include 100 wt % of siloxane polymer. In some embodiments, the core may include a composite of a siloxane polymer and a (meth)acrylic polymer.

Examples of the siloxane polymer include polydimethylsiloxane and examples of the (meth)acrylic polymer include poly(methyl methacrylate), without being limited thereto.

When the core includes a composite of a siloxane polymer and a (meth)acrylic polymer, the core can include the (meth)acrylic polymer in an amount of about 40 wt % or less, for example, about 1 wt % to about 40 wt %, as another example, about 1 wt % to about 30 wt %, and as another example, about 1 wt % to about 20 wt %, based on the total weight (100 wt %) of the core. In some embodiments, the core of the silicon impact modifier can include the (meth)acrylic polymer in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %, based on the total weight (100 wt %) of the core.

When the core includes a composite of a siloxane polymer and a (meth)acrylic polymer, the core of the silicon impact modifier can include the siloxane polymer in an amount of about 60 wt % or more, for example, about 70 wt % to about 99 wt %, and as another example, about 80 wt % to about 99 wt %, based on the total weight of the core. In some embodiments, the core of the silicon impact modifier can include the siloxane polymer in an amount of about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, or 99 wt %, based on the total weight (100 wt %) of the core.

The (meth)acrylic polymer of the shell may be, for example, poly(methyl methacrylate), without being limited thereto.

In the silicon impact modifier, a weight ratio of the siloxane polymer to the (meth)acrylic polymer in the shell and/or the core may range from about 3:1 to about 10:1, for example, from about 4:1 to about 7:1, and as another example, from about 4:1 to about 6:1. When the weight ratio of the siloxane polymer to the (meth)acrylic polymer in the shell and/or the core satisfies the range as set forth above, the resin composition can have better mechanical properties, low smoke properties and/or flame retardancy.

The impact modifier having high silicon content as set forth above may include, for example, commercially available METABLEN SX-005 (Mitsubishi Rayon Co., Ltd.), without being limited thereto.

The flame retardant resin composition can include the (B) silicon impact modifier in an amount of about 1 part by weight to about 10 parts by weight, for example, about 1 part by weight to about 7 parts by weight, and as another example, about 3 parts by weight to about 6 parts by weight, relative to about 100 parts by weight of the (A) polycarbonate resin. In some embodiments, the (B) flame retardant resin composition can include the silicon impact modifier in an amount of about 1 part by weight, 2 parts by weight, 3 parts by weight, 4 parts by weight, 5 parts by weight, 6 parts by weight, 7 parts by weight, 8 parts by weight, 9 parts by weight, or 10 parts by weight relative to about 100 parts by weight of the (A) polycarbonate resin. Within this range, the resin composition can have better mechanical properties, low smoke properties, and/or flame retardancy.

(C) Flame Retardant

The flame retardant resin composition according to the present invention includes the flame retardant to improve flame retardancy thereof.

The flame retardant according to the present invention includes a mixture of magnesium carbonate represented by Formula 1 and magnesium calcium carbonate represented by Formula 2:

$$Mg_a(CO_3)_b(OH)_{2a-2b} \cdot cH_2O \quad \text{[Formula 1]}$$

wherein a is 1 to 6, b is 0 to 5, and c is 0 to 6;

$$Mg_xCa_y(CO_3)_{x+y} \cdot mH_2O \quad \text{[Formula 2]}$$

wherein x and y are the same or different and are each independently 1 to 5, and m is 0 to 5.

For example, the magnesium carbonate represented by Formula 1 may be hydromagnesite, $(Mg_5(CO_3)_4(OH)_2 \cdot 4H_2O)$ obtained when a is 5, b is 4, and c is 4.

For example, the magnesium calcium carbonate represented by Formula 2 may be huntite $(Mg_3Ca(CO_3)_4)$ obtained when x is 3, y is 1, and m is 0.

For example, the flame retardant may be a mixture of hydromagnesite and huntite.

Although a phosphorus flame retardant has been typically used as a flame retardant for a polycarbonate resin, use of the phosphorus flame retardant alone cannot provide low smoke properties required of materials for transportation equipment. When aluminum trioxide, magnesium dioxide or the like is used instead of the phosphorus flame retardant, there are problems in that it can be difficult for the resin composition to have low smoke properties sufficient for materials for transportation equipment, decomposition of the resin can be caused at high temperature, and it can be difficult to apply the resin composition to an extrusion process due to brittleness of the resin.

However, it was found that the resin composition could have excellent low smoke properties and moldability when the flame retardant including the mixture of magnesium carbonate represented by Formula 1 and magnesium calcium carbonate represented by Formula 2 was used as in the present invention.

According to the present invention, the flame retardant may include magnesium carbonate represented by Formula 1 and magnesium calcium carbonate represented by Formula 2 in a weight ratio of about 3:1 to about 2:1, without being limited thereto. The flame retardant including the mixture of the magnesium carbonate and the magnesium calcium carbonate as set forth above may include commercially available Ultracarb (LKAB Co., Ltd.), without being limited thereto.

The flame retardant resin composition can include the mixture of magnesium carbonate represented by Formula 1 and magnesium calcium carbonate represented by Formula 2 in an amount of about 1 part by weight to about 20 parts by weight, for example, about 1 part by weight to about 15 parts by weight, relative to about 100 parts by weight of the (A) polycarbonate resin. In some embodiments, the flame retardant resin composition can include the mixture of magnesium carbonate represented by Formula 1 and magnesium calcium carbonate represented by Formula 2 in an amount of about 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, or 20 parts by weight relative to about 100 parts by weight of the (A) polycarbonate resin. Within this range, the resin composition can have further improved low smoke properties and mechanical properties.

The resin composition may further include a phosphorus flame retardant in addition to the mixture of magnesium carbonate represented by Formula 1 and magnesium calcium carbonate represented by Formula 2. Examples of the phosphorus flame retardant may include phosphate, phosphite, phosphonate, phosphazene, and/or phosphinate compounds, and the like, without being limited thereto. The flame retardant resin composition can include the phosphorus flame retardant in an amount of about 5 parts by weight to about 15 parts by weight relative to about 100 parts by weight of the (A) polycarbonate resin.

The flame retardant resin composition according to the present invention may further include one or more additives in addition to the components as set forth above, as needed. Examples of the additives may include without limitation flame retardant aids, lubricants, plasticizers, heat stabilizers, antioxidants, photostabilizers, and/or colorants. These additives may be used in combination thereof depending upon properties of a final molded article.

The flame retardant aids can further improve flame retardancy of the resin composition and may be selected from any materials typically used in the art, without being limited thereto.

The lubricants can help flow and/or movement of the resin composition, for example, by lubricating a metal surface contacting the resin composition during processing, molding and/or extrusion and may be selected from any materials typically used in the art, without being limited thereto.

The plasticizers can increase flexibility, workability and/or expansibility of the resin composition and may be selected from any materials typically used in the art, without being limited thereto.

The heat stabilizers can suppress thermal decomposition of the resin composition upon kneading and/or molding at high temperature and may be selected from any materials typically used in the art, without being limited thereto.

The antioxidants can prevent the resin composition from being decomposed by suppressing and/or blocking chemical reaction between the resin composition and oxygen, and may include at least one of phenol, phosphite, thioether, and/or amine antioxidants, without being limited thereto.

The photostabilizers can prevent change in color and/or loss of mechanical properties of the resin composition by suppressing and/or blocking the resin composition from being decomposed due to ultraviolet light, and may include, for example, titanium dioxide.

The colorants may include pigments and/or dyes.

The flame retardant resin composition can include additives in an amount of about 1 part by weight to about 15 parts by weight relative to about 100 parts by weight of the polycarbonate resin.

The flame retardant resin composition according to the present invention as set forth above may be prepared by a method of preparing a resin composition, which is well known in the art. For example, the flame retardant resin composition according to the present invention may be prepared in the form of pellets by mixing the polycarbonate resin, the impact modifier, the flame retardant and the optional additives, which are set forth above, followed by melt-extruding the mixture using an extruder.

A molded article may be manufactured by molding the flame retardant resin composition according to the present invention as set forth above. Here, a method of molding the resin composition is not particularly limited and may include various molding methods well known in the art, such as injection molding, blow molding, extrusion, thermal molding, and the like.

The molded article produced from the flame retardant resin composition according to the present invention may be advantageously used for various applications such as automotive parts, railway vehicle parts, building interior and/or exterior materials, electrical and/or electronic parts, and the like. The molded article according to the present invention can have excellent mechanical properties, low smoke properties and/or flame retardancy and thus can be suitable as an interior and/or exterior material of transportation equipment, such as automotive parts and/or railway vehicle parts.

The molded article according to the present invention may have a cumulative value of specific optical densities in the first 4 min of the test (VOF4) of about 300 minutes or less, for example, about 280 minutes or less, and as another example, about 150 minutes to about 270 minutes, as measured in accordance with ISO 5659-2, and thus can have excellent low smoke properties.

The molded article according to the present invention may have a critical heat flux at extinguishment (CFE) of about 10 $kW/m^2$ or more, for example, about 15 $kW/m^2$ or more, and as another example, about 20 $kW/m^2$ to about 25 $kW/m^2$, as measured in accordance with ISO 5658-2, and can have excellent flame retardancy due to such high CFE.

The molded article according to the present invention may have a maximum average rate of heat emission (MARHE) of about 105 $kW/m^2$ or less, for example, about 100 $kW/m^2$ or less, and as another example, about 80 $kW/m^2$ to about 90 $kW/m^2$, as measured in accordance with ISO 5660-1, and can have excellent flame retardancy due to such low MARHE.

Next, the present invention will be described in more detail with reference to the following examples. It should be understood that these examples are provided for illustration only and are not to be construed in any way as limiting the present invention.

EXAMPLES

Details of components used in Examples and Comparative Examples are as follows.

(A) Polycarbonate Resin (a1) A bisphenol-A polycarbonate (Cheil Industries Inc.) having a melt flow index (MI, 300° C., 1.2 kgf, ISO 1133) of 8 g/10 min to 10 g/10 min is used.

(a2) A bisphenol-A polycarbonate (Cheil Industries Inc.) having a melt flow index (MI, 300° C., 1.2 kgf, ISO 1133) of 20 g/10 min to 22 g/10 min is used.

(B) Impact Modifier (b1) METABLEN SX-005 (Mitsubishi Co., Ltd., siloxane content: 81 wt % (based on the total weight of the impact modifier)) is used.

(b2) METABLEN S2001 (Mitsubishi Co., Ltd., siloxane content: 54 wt % (based on the total weight of the impact modifier)) is used.

(C) Flame Retardant (c1) Ultracarb (LKAB Co., Ltd.) is used.

(c2) Aluminum trioxide (Albemable Co., Ltd.) is used.

(c3) Magnesium dioxide (Albemable Co., Ltd.) is used.

Examples and Comparative Examples

The components are mixed in amounts as listed in Table 1, followed by adding 0.3 parts by weight of an antioxidant (Irganox 1076), 0.3 parts by weight of a lubricant (Luwax E), and 1.0 part by weight of a flame retardant aid (PTFE 7A, DuPont Co., Ltd.) relative to 100 parts by weight of the resin composition mixture, and then extruded at a temperature of 300° C. using a 45Φ twin-screw extruder while side-feeding 10 parts by weight of bisphenol-A bis(diphenyl phosphate) (BDP) into the extruder, thereby preparing a flame retardant resin composition in the form of pellets. A specimen of the prepared resin composition is prepared, followed by evaluating the following properties of the specimen. Results are shown in Table 1.

Evaluation of Properties (1) Notched-IZOD impact strength (unit: kgf·cm/cm): A ⅛" thick specimen is prepared, and notched-IZOD impact strength of the specimen is measured in accordance with ASTM D256.

(2) Melt flow index (MI, g/10 min): Melt flow index is measured at 300° C. under a load of 1.2 kg in accordance with ISO 1133.

(3) Heat resistance (° C.): Vicat softening temperature (VST) is measured under a load of 5 kg in accordance with ASTM D1525.

(4) Flame retardancy: Flame retardancy is measured on 1.5 mm thick and 1.0 mm thick specimens according to the UL-94 vertical flammability test method.

(5) Maximum average rate of heat emission (MARHE, $kW/m^2$): MARHE is measured in accordance with ISO 5660-1.

(6) Cumulative value of specific optical densities in the first 4 min of the test (VOF4, min): VOF4 is measured in accordance with ISO 5659-2.

(7) Critical heat flux at extinguishment (CFE, $kW/m^2$): CFE is measured in accordance with ISO 5658-2.

TABLE 1

|  |  | Example | | | Comparative Example | | | | | | | |
|---|---|---|---|---|---|---|---|---|---|---|---|---|
|  |  | 1 | 2 | 3 | 1 | 2 | 3 | 4 | 5 | 6 | 7 | 8 |
| (A) | (a1) | 50 | 50 | 50 | 50 | 50 | 50 | 50 | 50 | 50 | 50 | 50 |
|  | (a2) | 50 | 50 | 50 | 50 | 50 | 50 | 50 | 50 | 50 | 50 | 50 |
| (B) | (b1) | 5 | 5 | 5 | 5 | — | 5 | 5 | 5 | 5 | 5 | 5 |
|  | (b2) | — | — | — | — | 5 | — | — | — | — | — | — |
| (C) | (c1) | 5 | 10 | 15 | — | 5 | — | — | — | — | — | — |
|  | (c2) | — | — | — | — | — | 5 | 10 | 15 | — | — | — |
|  | (c3) | — | — | — | — | — | — | — | — | 5 | 10 | 15 |
| IZ impact strength (kgf · cm/cm) | | 84.2 | 80.2 | 88.8 | 90 | 7.1 | 80.2 | 74.5 | 61.2 | 81.1 | 78.6 | 75.4 |
| MI (g/10 min) | | 7.2 | 7.9 | 8.4 | 7 | 12.2 | 9.6 | 16.1 | 24.8 | 8.4 | 14.7 | 21.1 |
| VST (° C.) | | 145 | 145 | 144 | 145 | 145 | 145 | 142 | 140 | 146 | 142 | 141 |
| Flame retardancy | 1.5 T | V-0 | V-0 | V-0 | V-2 | V-2 | V-1 | V-0 | V-0 | V-1 | V-0 | V-0 |
|  | 1.0 T | V-0 | V-0 | V-0 | V-2 | V-2 | V-1 | V-1 | V-1 | V-1 | V-1 | V-0 |
| MARHE (kW/m$^2$) | | 100.2 | 99.8 | 82.4 | 111.1 | 127 | 104.2 | 99.4 | 81.2 | 105.8 | 101.2 | 86.6 |
| VOF4 (min) | | 261 | 233 | 198 | 826 | 915 | 288 | 274 | 264 | 294 | 278 | 270 |
| CFE (kW/m$^2$) | | 11.8 | 16.7 | 22.8 | 9.7 | 7.2 | 10.8 | 12.4 | 14.2 | 10.4 | 13.1 | 14.7 |

*Unit: parts by weight relative to 100 parts by weight of (A)

As shown in Table 1, the resin compositions of Examples 1 to 3 have excellent mechanical properties due to high impact strength, and exhibit excellent properties in terms of low smoke properties (VOF4), critical flux at extinguishment (CFE) and heat emission properties (MARHE).

On the other hand, the resin composition of Comparative Example 1 including no flame retardant has low flame retardancy and exhibits poor properties in terms of low smoke properties (VOF4), critical flux at extinguishment (CFE) and heat emission properties (MARHE). In addition, the resin composition of Comparative Example 2, which is prepared using a general-purpose silicon impact modifier having low silicon content, exhibits poor properties in terms of impact strength, flame retardancy and critical flux at extinguishment, and in particular, exhibits extremely poor low smoke properties. The resin compositions of Comparative Examples 3 to 5 including aluminum trioxide as the flame retardant exhibit significant deterioration in terms of impact strength and moldability, insufficient low smoke properties, and have low flame retardancy due to high MARHE and low CFE, as compared with those of the Examples including the flame retardant in the same amount. The resin compositions of Comparative Examples 6 to 8 including magnesium dioxide as the flame retardant exhibit significantly deteriorated impact strength, insufficient low smoke properties, and deteriorated flame retardancy due to high MARHE and low CFE, as compared with those of the Examples including the flame retardant in the same amount.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. The scope of the present invention should be defined by the appended claims and equivalents thereof.

What is claimed is:

1. A flame retardant resin composition comprising:
   (A) a polycarbonate resin;
   (B) a silicon impact modifier; and
   (C) a flame retardant,
   wherein the (B) silicon impact modifier comprises particles having a core-shell structure and comprises about 60 wt % or more of a siloxane polymer,
   wherein the (C) flame retardant comprises a mixture of magnesium carbonate represented by Formula 1 and magnesium calcium carbonate represented by Formula 2:

$$Mg_a(CO_3)_b(OH)_{2a-2b} \cdot cH_2O \qquad \text{[Formula 1]}$$

wherein a is 1 to 6, b is greater than 0 to 5, and c is 0 to 6;

$$Mg_xCa_y(CO_3)_{x+y} \cdot mH_2O \qquad \text{[Formula 2]}$$

wherein x and y are the same or different and are each independently 1 to 5, and m is 0 to 5, and
   wherein the flame retardant includes the magnesium carbonate represented by Formula 1 and the magnesium calcium carbonate represented by Formula 2 in a weight ratio of about 3:1 to about 2:1.

2. The resin composition according to claim 1, comprising the (B) silicon impact modifier in an amount of about 1 part by weight to about 10 parts by weight relative to about 100 parts by weight of the (A) polycarbonate resin.

3. The resin composition according to claim 1, wherein the (B) silicon impact modifier comprises a core comprising a siloxane polymer and optionally further comprising a (meth)acrylic polymer and a shell comprising a (meth)acrylic polymer.

4. The resin composition according to claim 3, wherein the (B) silicon impact modifier comprises a core composed of a siloxane polymer and a shell composed of a (meth)acrylic polymer.

5. The resin composition according to claim 3, wherein the (B) silicon impact modifier comprises a core comprising a siloxane polymer and a (meth)acrylic polymer and a shell comprising a (meth)acrylic polymer.

6. The resin composition according to claim 3, wherein the (B) silicon impact modifier comprises the siloxane polymer and the (meth)acrylic polymer in a weight ratio of about 3:1 to about 10:1.

7. The resin composition according to claim 1, comprising the mixture of magnesium carbonate represented by Formula 1 and magnesium calcium carbonate represented by Formula 2 in an amount of about 1 part by weight to about 20 parts by weight relative to about 100 parts by weight of the (A) polycarbonate resin.

8. The resin composition according to claim 1, wherein the magnesium carbonate represented by Formula 1 is hydromagnesite.

9. The resin composition according to claim 1, wherein the magnesium calcium carbonate represented by Formula 2 is huntite.

10. The resin composition according to claim 1, wherein the flame retardant comprises a mixture of hydromagnesite and huntite.

11. The resin composition according to claim 1, wherein a molded article produced from the resin composition has a cumulative value of specific optical densities in the first 4 min of the test (VOF4) of about 150 minutes to about 300 minutes as measured in accordance with ISO 5659-2; a critical heat flux at extinguishment (CFE) of about 10 to about 25 kW/m$^2$ as measured in accordance with ISO 5658-2; and a maximum average rate of heat emission (MARHE) of about 80 to about 105 kW/m$^2$ as measured in accordance with ISO 5660-1.

12. A molded article produced from the flame retardant resin composition according to claim 1.

13. The molded article according to claim 12, wherein the molded article has a cumulative value of specific optical densities in the first 4 min of the test (VOF4) of about 300 minutes or less, as measured in accordance with ISO 5659-2.

14. The molded article according to claim 12, wherein the molded article has a cumulative value of specific optical densities in the first 4 min of the test (VOF4) of about 150 minutes to about 300 minutes, as measured in accordance with ISO 5659-2.

15. The molded article according to claim 12, wherein the molded article has a critical heat flux at extinguishment (CFE) of about 10 kW/m$^2$ or more, as measured in accordance with ISO 5658-2.

16. The molded article according to claim 12, wherein the molded article has a critical heat flux at extinguishment (CFE) of about 10 to about 25 kW/m$^2$, as measured in accordance with ISO 5658-2.

17. The molded article according to claim 12, wherein the molded article has a maximum average rate of heat emission (MARHE) of about 105 kW/m$^2$ or less, as measured in accordance with ISO 5660-1.

18. The molded article according to claim 12, wherein the molded article has a maximum average rate of heat emission (MARHE) of about 80 to about 105 kW/m$^2$, as measured in accordance with ISO 5660-1.

19. The molded article according to claim 12, wherein the molded article is an interior and/or exterior material of transportation equipment.

* * * * *